(12) United States Patent
Jeon et al.

(10) Patent No.: US 8,705,219 B2
(45) Date of Patent: Apr. 22, 2014

(54) ELECTROSTATIC DISCHARGE PROTECTION CIRCUIT

(71) Applicant: Samsung Electronics Co., Ltd., Suwon-si (KR)

(72) Inventors: Chan Hee Jeon, Hwaseong-si (KR); Doo Hyung Kim, Suwon-si (KR); Han Gu Kim, Seongnam-si (KR); Woo Jin Seo, Seongnam-si (KR); Ki Tae Lee, Seongnam-si (KR); Hong Wook Lim, Suwon-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/744,424

(22) Filed: Jan. 18, 2013

(65) Prior Publication Data

US 2013/0182359 A1    Jul. 18, 2013

(30) Foreign Application Priority Data

Jan. 18, 2012   (KR) .................. 10-2012-0005909

(51) Int. Cl.
*H02H 3/22* (2006.01)
(52) U.S. Cl.
USPC .................................. 361/56; 361/111
(58) Field of Classification Search
USPC .................................. 361/56, 111
See application file for complete search history.

(56) References Cited

U.S. PATENT DOCUMENTS

| | | | |
|---|---|---|---|
| 6,392,860 B1 | 5/2002 | Lin et al. | |
| 7,221,551 B2 * | 5/2007 | Chen .......................... | 361/230 |
| 7,280,328 B2 | 10/2007 | Arai et al. | |
| 7,283,342 B1 | 10/2007 | Ker et al. | |
| 7,795,637 B2 | 9/2010 | Hwang | |
| 2005/0099744 A1 | 5/2005 | Kitagawa | |
| 2005/0180076 A1 | 8/2005 | Saito et al. | |
| 2007/0103825 A1 * | 5/2007 | Ker et al. ................... | 361/56 |

FOREIGN PATENT DOCUMENTS

| | | |
|---|---|---|
| JP | 2005-142494 | 6/2005 |
| KR | 10-2010-0084606 | 7/2010 |

\* cited by examiner

*Primary Examiner* — Danny Nguyen
(74) *Attorney, Agent, or Firm* — Muir Patent Consulting, PLLC (57) ABSTRACT

An electrostatic discharge (ESD) protection circuit includes a first power line; a second power line; a ground line; two stack transistors connected in series between the first power line and the ground line; a first resistor connected between the first power line and a first node; a first transistor and a capacitor connected in series between the first node and the ground line; a second transistor connected between the second power line and a second node; a third transistor connected between the first power line and a third node; an inverter, connected between the third node and the ground line, and having an input connected to the second node; a fourth transistor, connected to the first power line, and having a gate connected to the second node; and a fifth transistor, connected between the second power line and the third node, and having a gate connected to a terminal of the fourth transistor.

20 Claims, 11 Drawing Sheets

ELECTROSTATIC DISCHARGE PROTECTION CIRCUIT

CROSS-REFERENCE TO RELATED APPLICATIONS

This application claims priority under 35 U.S.C. §119(a) from Korean Patent Application No. 10-2012-0005909 filed on Jan. 18, 2012, the disclosure of which is hereby incorporated by reference in its entirety.

BACKGROUND

The present disclosure relates to an electrostatic discharge protection circuit for preventing an internal element from being damaged due to the generation of static electricity.

In order to implement a digital interface operating at high speed, a medium gate oxide transistor operating at a voltage lower than a high supply voltage provided to an integrated circuit (IC) may be used, and simultaneously a thick gate oxide transistor is used to provide an interface in the IC with the supply voltage as well. In this case, different types of transistors are implemented in an IC, thereby causing manufacturing processes to be complicated and increasing manufacturing price.

In addition, since electrostatic current induced by electrostatic discharge (ESD) in a semiconductor IC tends to concentrate on the weakest part of a transistor, melting may occur at a junction, a contact, or a gate oxide, causing failures. As a result, since the medium gate oxide transistor uses a thin gate oxide, long-term reliability cannot be guaranteed.

SUMMARY

According to some embodiments, there is provided an electrostatic discharge (ESD) protection circuit including a first power line configured to provide a first power supply voltage; a second power line configured to provide a second power supply voltage; a ground line connected to a ground voltage terminal; at least two stack transistors connected in series between the first power line and the ground line; a first resistor connected between the first power line and a first node; a first transistor and a first capacitor connected in series between the first node and the ground line; a second transistor, connected between the second power line and a second node, and having a gate connected to the ground line; a third transistor, connected between the first power line and a third node, and having a gate connected to the first node; an inverter, connected between the third node and the ground line, and having an input connected to the second node; a fourth transistor, connected to the first power line, and having a gate connected to the second node; and a fifth transistor, connected between the second power line and the third node, and having a gate connected to a terminal of the fourth transistor.

A gate of the first transistor may be connected to the third node.

The at least two stack transistors may include a sixth transistor, connected to the first power line, and having a gate connected to the third node; and a seventh transistor, connected between the sixth transistor and the ground line, and having a gate connected to an output node of the inverter.

The inverter may include an eighth transistor connected between the third node and a fourth node corresponding to the output node of the inverter, and a ninth transistor connected between the fourth node and the ground line.

Each of the second, third, and eighth transistors may be a p-channel metal oxide semiconductor (PMOS) transistor.

Each of the first, fourth, fifth, sixth, seventh, and ninth transistors may be an n-channel metal oxide semiconductor (NMOS) transistor.

The ESD protection circuit may further include a second resistor connected between the gate of the second transistor and the ground line.

The first power supply voltage may be externally applied to the ESD protection circuit and the second power supply voltage may be generated from the first power supply voltage.

The ESD protection circuit may further include a voltage divider configured to divide the first power supply voltage and generate the second power supply voltage.

The ESD protection circuit may further include at least one resistor between the first power line and an another terminal of the fourth transistor.

According to other embodiments, there is provided an ESD protection circuit including a first power line configured to provide a first power supply voltage, a second power line configured to provide a second power supply voltage, a ground line connected to a ground voltage terminal, a stack circuit including at least two transistors connected in series between the first power line and the ground line to tolerate or discharge the first power supply voltage, an ESD pulse detector circuit configured to detect an electrostatic current between the first power line and the ground line, an inverter controller circuit connected between the second power line and the ground line and configured to output a first signal lower than the second power supply voltage, an inverter unit connected between the first power line and the ground line and configured to output a second signal obtained by inverting the first signal and to apply the second signal to one of the transistors included in the stack circuit, and a gate biasing circuit configured to apply a third signal obtained by changing the second power supply voltage according to the first power supply voltage to another one of the transistors included in the stack circuit and the ESD pulse detector.

BRIEF DESCRIPTION OF THE DRAWINGS

The above and other features and advantages of the disclosure will become more apparent by describing in detail exemplary embodiments thereof with reference to the attached drawings in which.

DETAILED DESCRIPTION OF THE EMBODIMENTS

The disclosure now will be described more fully hereinafter with reference to the accompanying drawings, in which various exemplary embodiments are shown. This invention may, however, be embodied in many different forms and should not be construed as limited to the embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
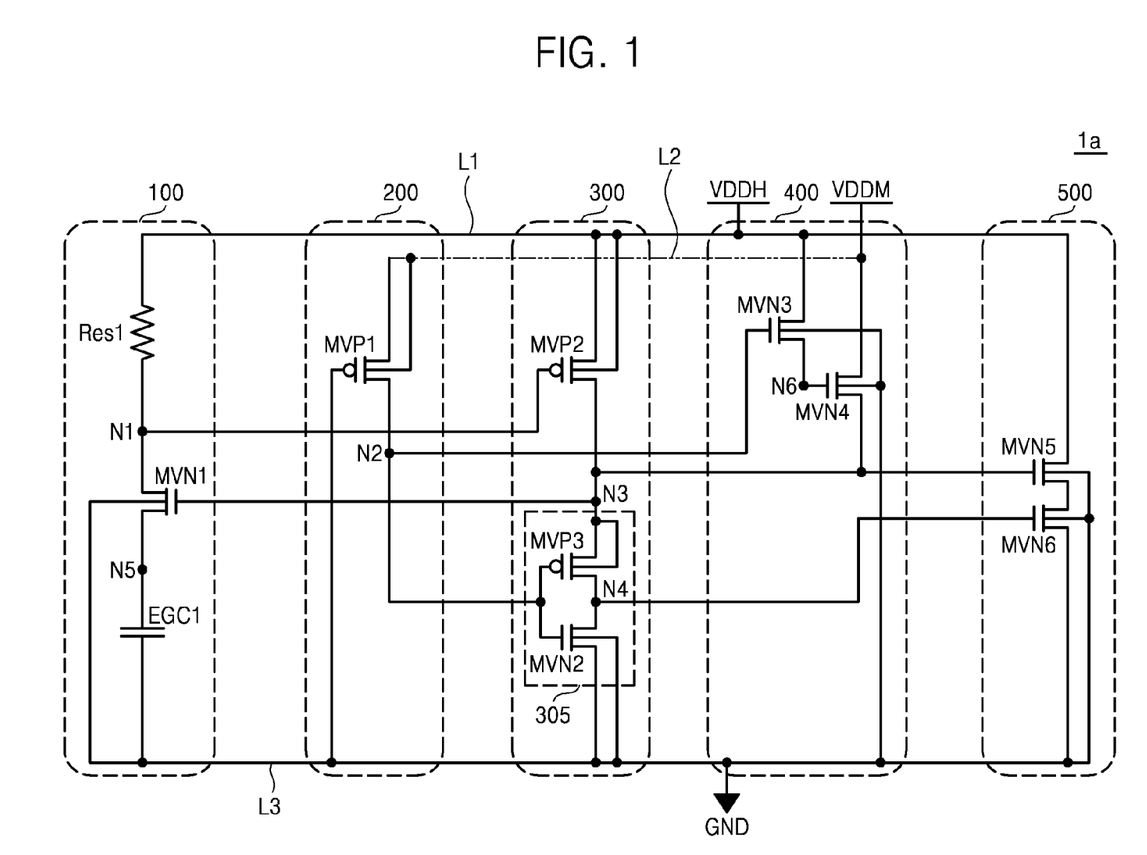
FIG. 1 is a circuit diagram of an electrostatic discharge (ESD) protection circuit according to some exemplary embodiments.

FIG. 1 is a circuit diagram of an electrostatic discharge (ESD) protection circuit 1a according to some exemplary embodiments. The ESD protection circuit 1a includes an ESD pulse detector circuit 100, an inverter controller circuit 200, an inverter unit 300, a gate biasing circuit 400, and a stack circuit 500.

In detail, the ESD protection circuit 1a includes a first power line L1, a second power line L2, a ground line L3, at least two stack transistors MVN5 and MVN6, a first resistor Res1, a first transistor MVN1, a first capacitor EGC1, a second transistor MVP1, a third transistor MVP2, inverters MVP3 and MVN2, a fourth transistor MVN3, and a fifth transistor MVN4. In one embodiment, first transistor MVN1, second transistor MVP1, third transistor MVP2, fourth transistor MVN3, and fifth transistor MVN4 are pull-up transistors. For convenience' sake in the description, junctions between circuit elements in the ESD protection circuit 1a are denoted by first through sixth nodes N1 through N6.

The first power line L1, the second power line L2, and the ground line L3 are connected to power terminals (e.g., power pins), and they are power nodes of the ESD protection circuit 1a, which allow external access to the ESD protection circuit 1a through, for example, an integrated circuit (IC) pad, a bond wire, or an IC package pin. The power nodes in the ESD protection circuit 1a may be directly or indirectly bonded to a package pin related with an IC device including the ESD protection circuit 1a.

The ESD pulse detector circuit 100 detects electrostatic current between the first power line L1 and the ground line L3. The ESD pulse detector circuit 100 includes the first resistor Res1, the first transistor MVN1, and the first capacitor EGC1, which are connected in series between the first power line L1 and the ground line L3. The first resistor Res1 is connected between the first power line L1 and the first node N1. A terminal of the first transistor MVN1 is connected to the first node N1. Another terminal of the first transistor MVN1 is connected to the fifth node N5. A gate of the first transistor MVN1 is connected to the third node N3. A body of the first transistor MVN1 is connected to the ground line L3. The first capacitor EGC1 is connected between the fifth node N5 and the ground line L3.

The inverter controller circuit 200 is a circuit that controls the inverter unit 300. The inverter controller circuit 200 is connected between the second power line L2 and the ground line L3 and outputs a first signal. The inverter controller circuit 200 includes the second transistor MVP1 connected between the second power line L2 and the second node N2. A gate of the second transistor MVP1 is connected to the ground line L3 and a body thereof is connected to the second power line L2.

The inverter unit 300 is a circuit connected between the first power line L1 and the ground line L3. The inverter unit 300 inverts the first signal to generate a second signal and applies the second signal to the seventh transistor MVN6 of the stack circuit 500. The inverter unit 300 includes the third transistor MVP2 connected between the first power line L1 and the third node N3 and an inverter 305 connected between the third node N3 and the ground line L3. An input of the inverter 305 is connected to the second node N2. The inverter 305 includes an eighth transistor MVP3 connected between the third node N3 and an output node of the inverter 305, i.e., the fourth node N4; and a ninth transistor MVN2 connected between the fourth node N4 and the ground line L3. A gate of the third transistor MVP2 is connected to the first node N1 and a body thereof is connected to the first power line L1. A gate of the eighth transistor MVP3 is connected to the second node N2 and a body thereof is connected to the third node N3. A gate of the ninth transistor MVN2 is connected to the second node N2 and a body thereof connected to the ground line L3.

The gate biasing circuit 400 applies a third signal obtained by changing a second power supply voltage VDDM according to a first power supply voltage VDDH to the sixth transistor MVN5 of the stack circuit 500 and to the ESD pulse detector 100. The gate biasing circuit 400 includes the fourth transistor MVN3, which is connected to the first power line L1 and has a gate connected to the second node N2; and the fifth transistor MVN4, which is connected between the second power line L2 and the third node N3 and has a gate connected to a terminal of the fourth transistor MVN3, i.e., the sixth node N6. The gate of the fourth transistor MVN3 is connected to the second node N2 and a body thereof is connected to the ground line L3. The gate of the fifth transistor MVN4 is connected to the sixth node N6 and a body thereof is connected to the ground line L3.

The stack circuit 500 includes at least two transistors connected in series between the first power line L1 and the ground line L3 and tolerates or discharges the first power supply voltage VDDH. For instance, the at least two stack transistors may include the sixth transistor MVN5, which is connected to the first power line L1 and has a gate connected to the third node N3; and the seventh transistor MVN6, which is connected between the sixth transistor MVN5 and the ground line L3 and has a gate connected to an output of the inverter 305, i.e., the fourth node N4.

Transistors used in the disclosed embodiments may be a p-channel metal oxide semiconductor (PMOS) or an n-channel metal oxide semiconductor (NMOS) made using complementary metal oxide semiconductor (CMOS) manufacturing processes. The embodiments may also be applied to other appropriate devices (such as bipolar junction transistors (BJTs)) and/or manufacturing processes (e.g., BiCMOS manufacturing processes). For instance, in the embodiments illustrated in FIG. 1, the second, third, and eighth transistors MVP1, MVP2, and MVP3 are PMOS transistors; and the first, fourth, fifth, sixth, seventh, and ninth transistors MVN1, MVN3, MVN4, MVN5, MVN6, and MVN2 are NMOS transistors. In one embodiment, all of these transistors have gate oxide layers that are substantially the same size. For example, transistors MVP1, MVP2, MVP3, MVN1, MVN3, MVN4, MVN5, MVN6, and MVN2 may all be medium gate oxide transistors.

The operation of the ESD protection circuit 1a in a normal mode will be described. When the first power supply voltage VDDH is applied to the ESD protection circuit 1a, the first power supply voltage VDDH is applied to the first node N1 through the first resistor Res1 and the third transistor MVP2 is turned off. Since the gate of the second transistor MVP1 is connected to the ground line L3, the second transistor MVP1 is turned on and the second power supply voltage VDDM is applied to the second node N2. Since the gate of the fourth transistor MVN3 is connected to the second node N2, the fourth transistor MVN3 is turned on.

When the fourth transistor MVN3 is turned on by the potential of the second node N2, i.e., the second power supply voltage VDDM, a voltage as much as the second power supply voltage VDDM but lower than the first power supply voltage VDDH is applied to the sixth node N6 connected to the gate of the fifth transistor MVN4 and the fifth transistor MVN4 is turned on. As a result, the second power supply voltage VDDM is applied to the third node N3 and the first transistor MVN1 is turned on, so that the fifth node N5 is at the voltage level of the first power supply voltage VDDH. In addition, when the second power supply voltage VDDM is applied to the third node N3, the sixth transistor MVN5 is turned on. In addition, because node N2 has a voltage level of VDDM, ninth transistor MVN2 is turned on, so that a voltage at the fourth node N4 is inverted to a ground voltage GND of 0 V. When the fourth node N4 is at the ground voltage GND, the seventh transistor MVN6 is turned off.

Accordingly, in the normal mode of the ESD protection circuit 1a, the gate of the sixth transistor MVN5 is connected to the second power line L2, thereby receiving the second power supply voltage VDDM, and the gate of the seventh transistor MVN6 is connected to the ground line L3, thereby receiving 0 V, in the stack circuit 500. As a result, even though the first power supply voltage VDDH is applied to a terminal of the sixth transistor MVN5, the first power supply voltage VDDH is prevented by the seventh transistor MVN6 from being connected to the ground line L3, so that leakage current is reduced. In addition, since the second power supply voltage VDDM is applied to the gate of the sixth transistor MVN5 through the third node N3, the first power supply voltage VDDH is also applied to the seventh transistor MVN6, so that long-term reliability is also increased.

The operation of the ESD protection circuit 1a in an ESD mode will be described. The ESD protection circuit 1a is activated only when an electrostatic phenomenon occurs, to prevent a protected circuit from being seriously damaged by clamping a voltage of at least one input/output pad related to the protected circuit to a satisfactorily low level. The ESD protection circuit 1a forms a current discharge path to bypass a significant amount of electrostatic current.

In detail, in one embodiment, at a time prior to the power supplies VDDH and VDDM being on, when electrostatic current momentarily flows in the first power line L1, i.e., in an ESD transient mode, the ESD protection circuit 1a maintains the first node N1 at a low voltage level, e.g., 0 V of the ground line L3 using the first resistor Rest and the first capacitor EGC1 for a predetermined period of time. Accordingly, the third transistor MVP2 is turned on and a potential at the third node N3 rises to a range of the first power supply voltage VDDH. At this time, a clamp, transistors, and decoupling caps, which are connected to the second power line L2, act as parasitic capacitors.

When the potential at the second node N2 temporarily rises at the application of electrostatic current, i.e., an ESD pulse to the first power line L1, charge at the second node N2 moves through the second transistor MVP1 to a parasitic capacitor at a node having a lower potential of the second power supply voltage VDDM, so that the second node N2 is maintained again at a negative potential for the predetermined period of time. As a result, the fourth node N4 is at a high state, i.e., the first power supply voltage VDDH and the sixth and seventh transistors MVN5 and MVN6 are both turned on. Consequently, the electrostatic current in the first power line L1 is discharged to the ground line L3 through the stack circuit 500.

Accordingly, in the ESD mode, the ESD protection circuit 1a allows electrostatic current to be smoothly discharged through the ground line L3 even through the electrostatic current is supplied to the first power line L1.

Figure 2:
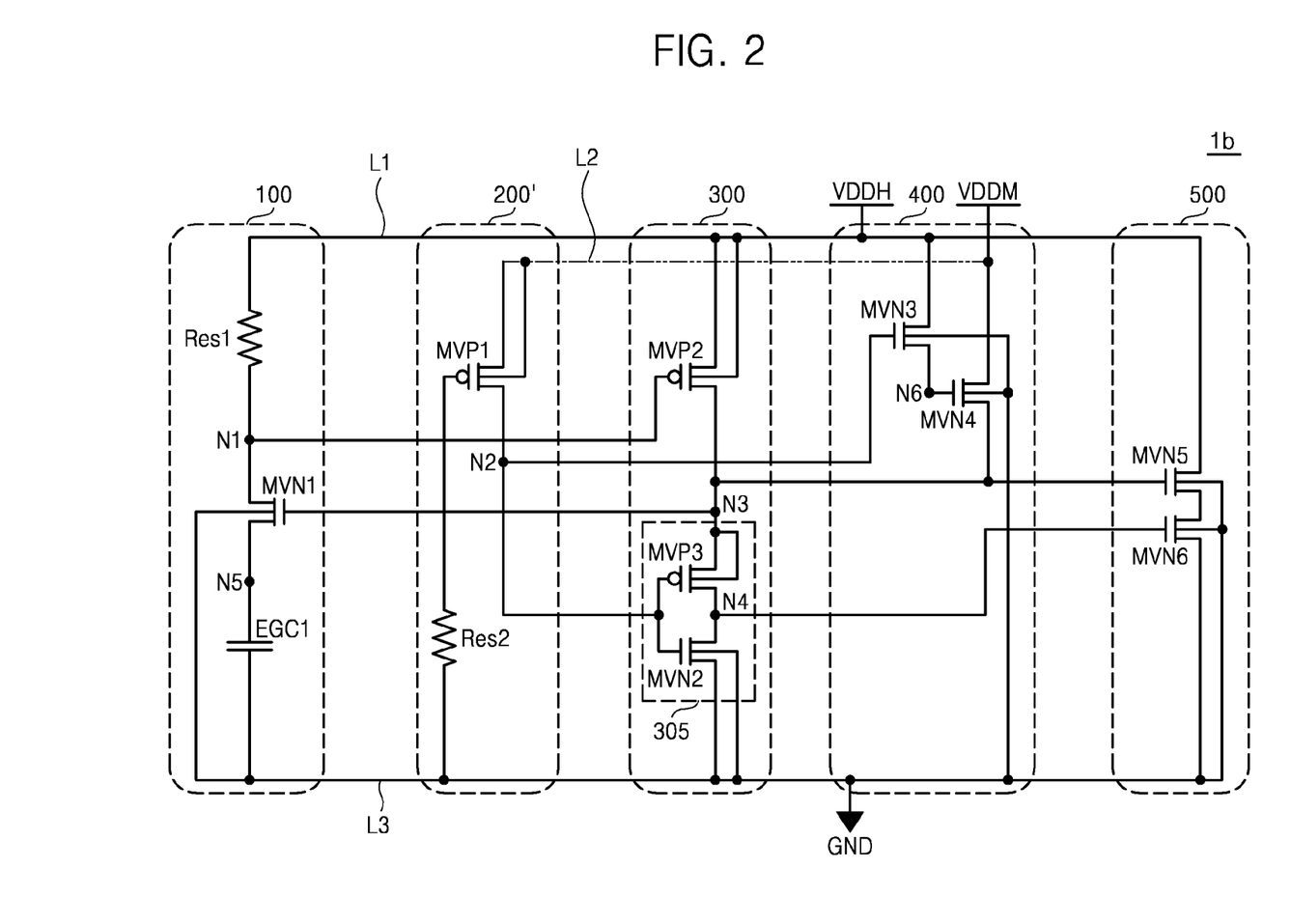
FIG. 2 is a circuit diagram of an ESD protection circuit according to other exemplary embodiments.

FIG. 2 is a circuit diagram of an ESD protection circuit 1b according to other exemplary embodiments. Referring to FIG. 2, the ESD protection circuit 1b includes the ESD pulse detector circuit 100, an inverter controller circuit 200', the inverter unit 300, the gate biasing circuit 400, and the stack circuit 500. To avoid redundancy, the description of the embodiments illustrated in FIG. 2 will focus on differences from the embodiments illustrated in FIG. 1.

Differently from the inverter controller circuit 200 illustrated in FIG. 1, the inverter controller circuit 200' also includes a second resistor Res2. The second transistor MVP1 is connected between the second power line L2 and the second node N2. The second transistor MVP1 has the gate connected to the ground line L3 and the body connected to the second power line L2. The second resistor Res2 is connected between the gate of the second transistor MVP1 and the ground line L3.

Figure 3:
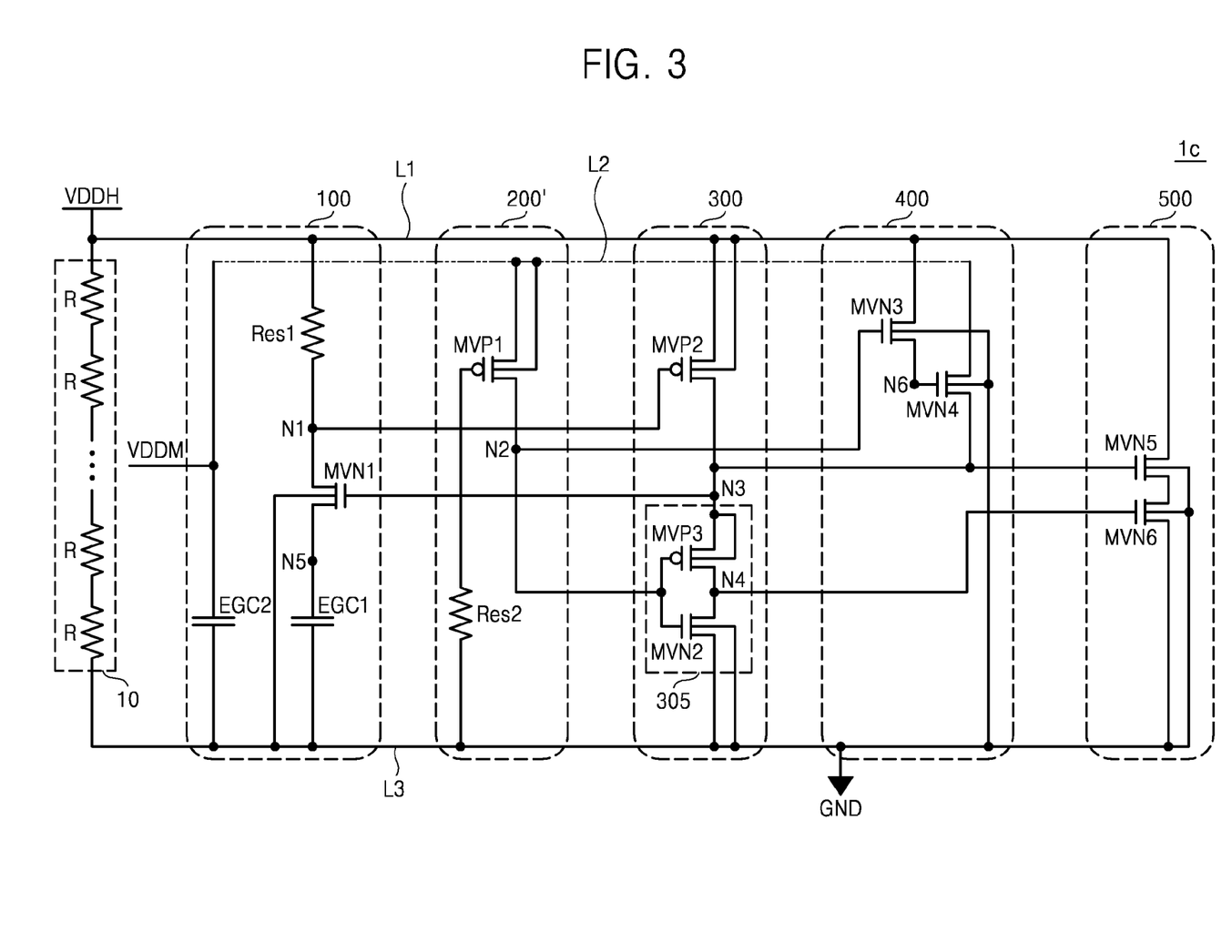
FIG. 3 is a circuit diagram of an ESD protection circuit according to further exemplary embodiments.

FIG. 3 is a circuit diagram of an ESD protection circuit 1c according to further exemplary embodiments. Referring to FIG. 3, the ESD protection circuit 1c includes the ESD pulse detector circuit 100, the inverter controller circuit 200', the inverter unit 300, the gate biasing circuit 400, and the stack circuit 500. To avoid redundancy, the description of the embodiments illustrated in FIG. 3 will focus on differences from the embodiments illustrated in FIGS. 1 and 2.

The first power supply voltage VDDH is externally applied to the ESD protection circuit 1c. The second power supply voltage VDDM may be generated from the first power supply voltage VDDH. The ESD protection circuit 1c may include a voltage divider 10 that divides the first power supply voltage VDDH to generate the second power supply voltage VDDM.

The ESD pulse detector circuit 100 may also include a second capacitor EGC2 between the second power supply voltage VDDM and the ground line L3. The ESD protection circuit 1c may include a resistor Res2, similar to FIG. 2, or may omit the resistor, similar to FIG. 1.

Figure 4:
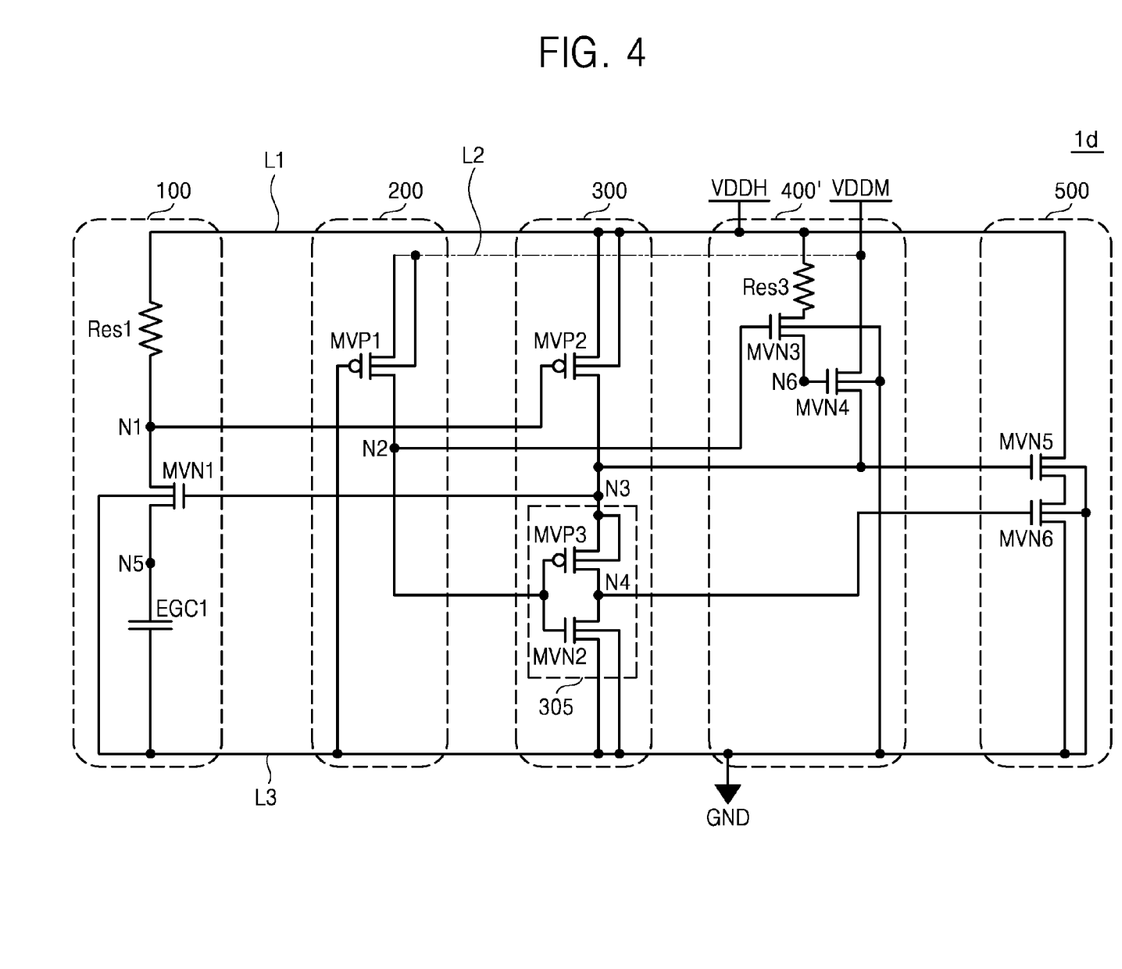
FIG. 4 is a circuit diagram of an ESD protection circuit according to other exemplary embodiments.

FIG. 4 is a circuit diagram of an ESD protection circuit 1d according to other exemplary embodiments. Referring to FIG. 4, the ESD protection circuit 1d includes the ESD pulse detector circuit 100, the inverter controller circuit 200, the inverter circuit 300, a gate biasing circuit 400', and the stack circuit 500. To avoid redundancy, the description of the embodiments illustrated in FIG. 4 will focus on differences from the embodiments illustrated in FIG. 1.

Differently from the gate biasing circuit 400 illustrated in FIG. 1, the gate biasing circuit 400' illustrated in FIG. 4 also includes a third resistor Res3. As such, the fourth transistor MVN3 may be indirectly connected to the first power line L1 via the third resistor Res3 instead of being directly connected to the first power line L1.

Figure 5:
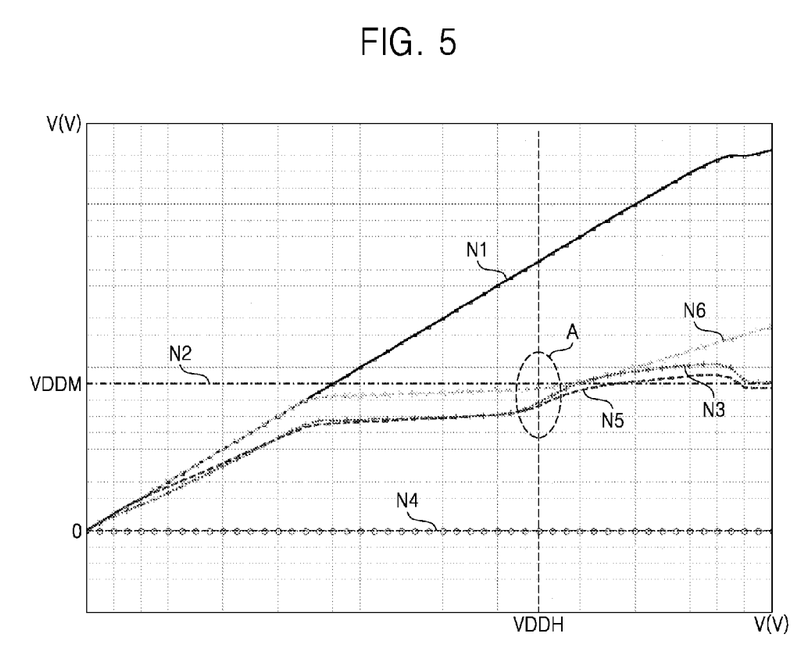
FIG. 5 is a graph of voltage versus voltage in the operation of an ESD protection circuit according to some exemplary embodiments.

FIG. 5 is a graph of voltage versus voltage in the operation of the ESD protection circuit 1a, 1b, 1c, or 1d according to some exemplary embodiments. Hereinafter, the ESD protection circuits 1a, 1b, 1c, and 1d are generally denoted by reference numeral 1.

The horizontal axis of the graph indicates the voltage of the first power line L1 and the vertical axis indicates the voltage at the nodes N1 through N6. The voltage at each of the nodes N1 through N6 when the first power supply voltage VDDH is applied to the first power line L1 after the second power supply voltage VDDM is applied to the second power line L2 (i.e., in an area A in the graph) will be described.

When the ESD protection circuit 1 operates normally, the first power supply voltage VDDH is applied to the first power line L1 and the second transistor MVP1 is turned on since the gate of the second transistor MVP1 is connected to the ground line L3, so that the second power supply voltage VDDM is applied to the second node N2. The first power supply voltage VDDH is applied to the first node N1, which turns off the third transistor MVP2. The voltage at the second node N2 turns on the fourth transistor MVN3, so that the second power supply voltage VDDM is applied to the sixth node N6. The voltage at the sixth node N6 turns on the fifth transistor MVN4, so that the second power supply voltage VDDM is applied to the third node N3. The voltage at the second node N2 is input to the inverter 305 and is inverted by the inverter 305 and the ground voltage GND is applied to the fourth node N4. The seventh transistor MVN6 is turned off by the voltage at the fourth node N4 and the sixth transistor MVN5 is turned on by the voltage at the third node N3.

When the ESD protection circuit 1 according to some embodiments operates normally, not all of the transistors MVN5 and MVN6 of the stack circuit 500 are turned on, so that the stack circuit 500 tolerates the first power supply voltage VDDH without using a thick gate oxide transistor. As such, a high-energy signal, e.g., a signal generating a voltage greater than a specified maximum gate oxide voltage, can be applied to a power pin of an IC without damaging the gate oxide of transistors in the IC. In addition, the IC is protected from electrostatic current.

Figure 6:
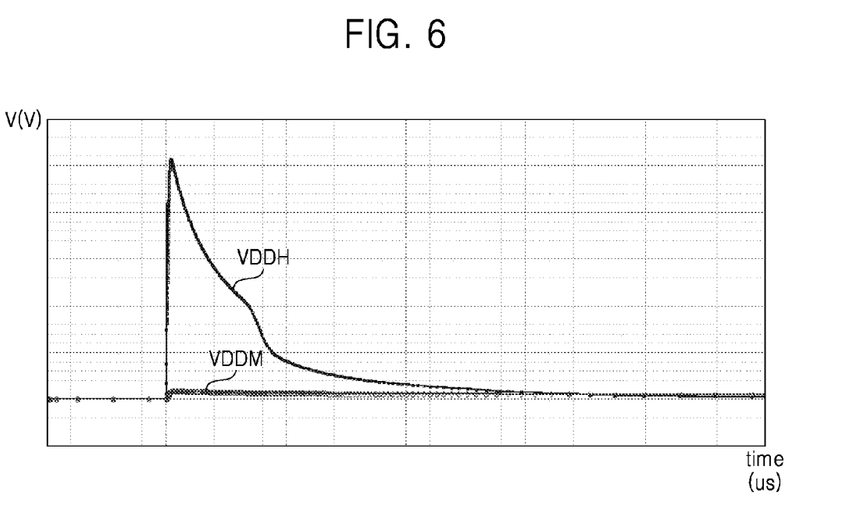
FIG. 6 is a graph of voltage versus time in a first power line and a second power line when electrostatic current flows in an ESD protection circuit according to some exemplary embodiments.
Figure 7:
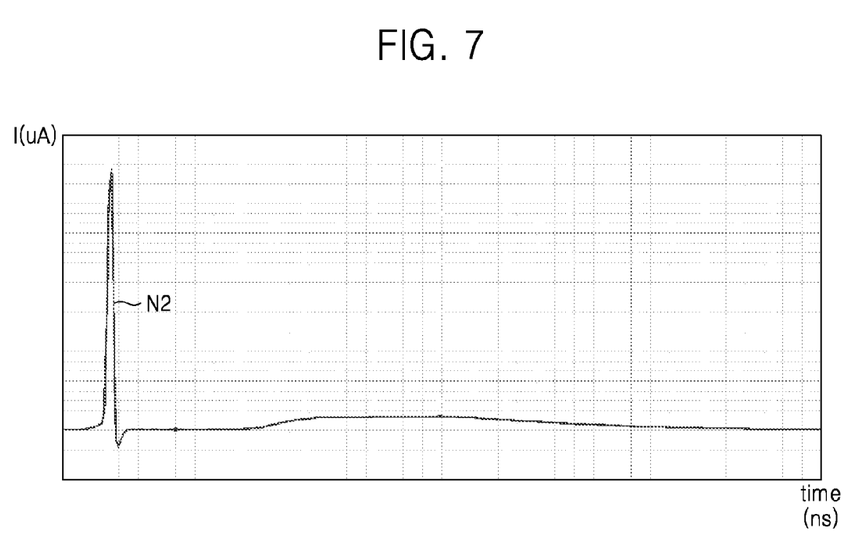
FIG. 7 is a current-time graph showing the current appearing at a second node when electrostatic current flows in an ESD protection circuit according to some exemplary embodiments.
Figure 8:
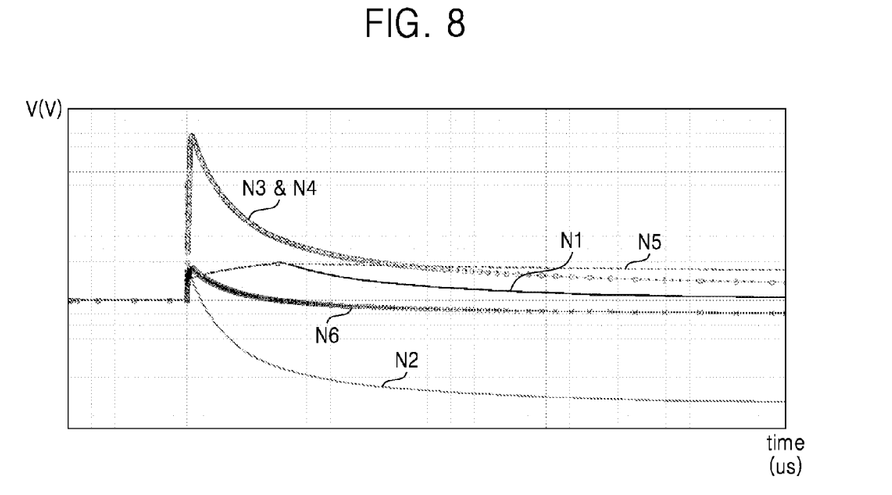
FIG. 8 is a voltage-time graph showing the voltage appearing at each node when electrostatic current flows in an ESD protection circuit according to some exemplary embodiments.

FIG. 6 is a graph of voltage versus time in the first power line L1 and the second power line L2 when electrostatic current flows in the ESD protection circuit 1 according to some exemplary embodiments. FIG. 7 is a current-time graph showing the current appearing at the second node N2 when electrostatic current flows in the ESD protection circuit 1 according to some exemplary embodiments. FIG. 8 is a voltage-time graph showing the voltage appearing at each of the nodes N1 through N6 when electrostatic current flows in the ESD protection circuit 1 according to some exemplary embodiments.

The graph illustrated in FIG. 6 shows the change of voltage in the ESD protection circuit 1 when static electricity is generated, i.e., in case of an ESD event. The generation of static electricity may be defined as including an excessive current pulse of an electrostatic voltage (e.g., of several thousands of volts (V)) or an electrostatic current (e.g., of several milliamperes (mA)) generally having a rising or falling time of less than several nanoseconds (ns).

Referring to FIG. 6, a voltage higher than a voltage applied to the first power line L1 in a normal mode is momentarily applied (e.g., a voltage tens, hundreds, or thousands times the voltage normally applied to the first power line L1), but the higher voltage is discharged by the ESD protection circuit 1 over time.

Referring to FIGS. 1 and 8, the horizontal axis of the graph indicates time and the vertical axis indicates voltage. The voltage appearing at the nodes N1 through N6 when a high voltage, i.e., an ESD voltage is momentarily applied to the first power line L1 will be described.

When an electrostatic voltage is applied to the first power line L1 in the ESD event of the ESD protection circuit 1, the first transistor MVN1 is turned on, so that the first node N1 is at a low state for a predetermined period of time, i.e., a resistive-capacity (RC) time based on the first resistor Res1 and the first capacitor EGC1. The third transistor MVP2 is turned on based on the voltage at the first node N1 for the RC time and a voltage of the first power line L1 is applied to the third node N3. Meanwhile, since a node of the second power supply voltage VDDM (referred to as a "second power node") tends to be at a relatively lower potential, charge at the second node N2 moves to the second power node via the second transistor MVP1, which decreases the potential of the second node N2. As a result, the eighth transistor MVP3 in the inverter 305 is turned on.

The ground voltage GND is applied to the gate of the second transistor MVP1, thereby turning on the second transistor MVP1, so a relatively much lower voltage of the second power line L2 is applied to the second node N2. Accordingly, the fourth transistor MVN3 is turned off, and therefore, the fifth transistor MVN4 is also turned off. As a result, a potential at a node of the first power line L1 is applied to the third and fourth transistors MVP2 and MVN3. Accordingly, the potential at the third node N3 is not leaked to the second power line L2 via the fifth transistor MVN4 but is retained and thus turns on the sixth transistor MVN5. Since the fourth node N4 comes to a high state due to the inverter 305, the seventh transistor MVN6 is turned on. Consequently, both of the transistors MVN5 and MVN6 in the stack circuit 500 are turned on, discharging all static electricity to the ground line L3.

Since all of the transistors MVN5 and MVN6 in the stack circuit 500 are turned on when electrostatic current is generated in the ESD protection circuit 1, the electrostatic current is entirely discharged to the ground line L3 even when a medium gate oxide transistor is used, and therefore, an IC is protected.

Figure 9:
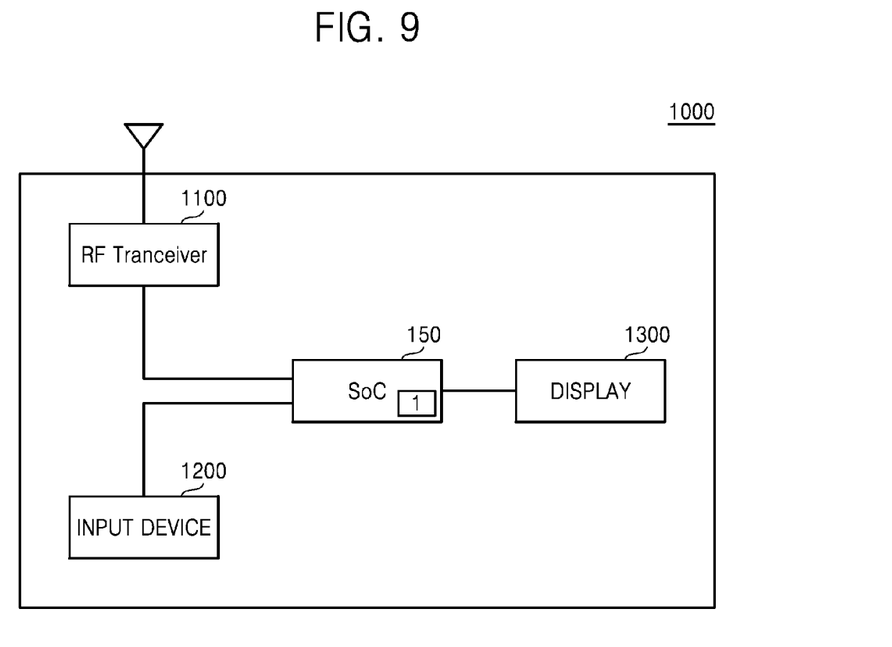
FIG. 9 is a block diagram of a mobile device including an ESD protection circuit according to some exemplary embodiments.

FIG. 9 is a block diagram of a mobile device 1000 including the ESD protection circuit 1 according to some exemplary embodiments. Referring to FIG. 9, the mobile device 1000 includes a system on chip (SoC) 150 including the ESD protection circuit 1, an antenna, a radio frequency (RF) transceiver 1100, an input device 1200, and a display 1300.

The radio transceiver 1100 transmits or receives radio signals through an antenna. For example, the radio transceiver 1100 may convert radio signals received through the antenna into signals that can be processed by the SoC 150. Accordingly, the SoC 100 may process the signals output from the radio transceiver 1100 and transmit the processed signals to the display 1300. Furthermore, the radio transceiver 1100 may also convert signals output from the SoC 150 into radio signals and outputs the radio signals to an external device through the antenna.

The input device 1200 enables control signals for controlling the operation of the SoC 150 or data to be processed by the SoC 150 to be input to the mobile device 1000. The input device 1200 may be implemented by a pointing device such as a touch pad or a computer mouse, a keypad, or a keyboard.

Figure 10:
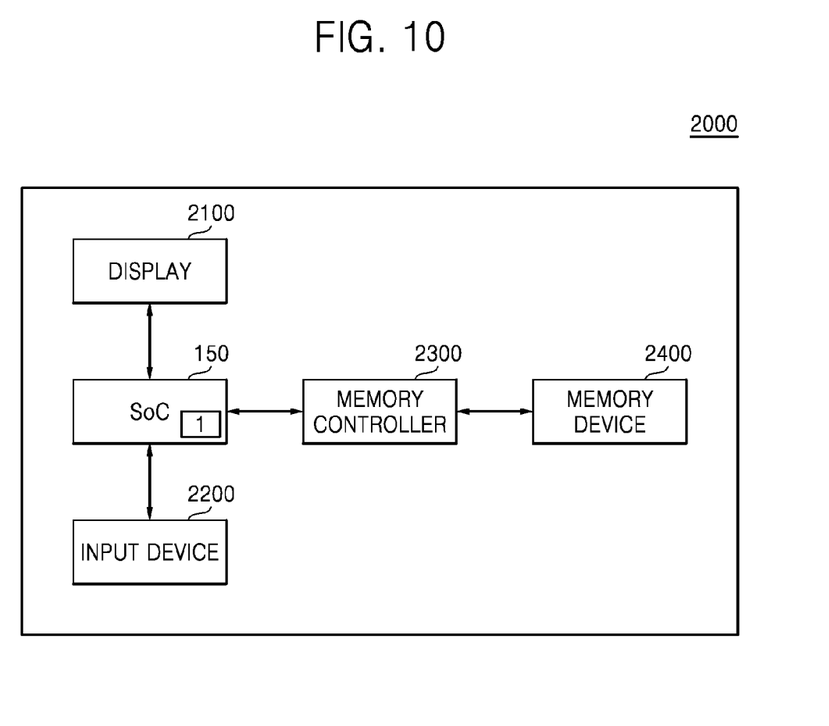
FIG. 10 is a block diagram of a computer system including an ESD protection circuit according to some exemplary embodiments.

FIG. 10 is a block diagram of a computer system including an ESD protection circuit according to some exemplary embodiments. Referring to FIG. 10, the computer system 2000 includes the SoC 150 including the ESD protection circuit 1 according to some embodiments, and the computer system 2000 may be implemented, for example, as a PC, a tablet PC, a net-book, an e-reader, a PDA, a portable multimedia player (PMP), an MP3 player, or an MP4 player.

The computer system 2000 includes the SoC 150, a memory device 2400, a memory controller 2300 controlling the data processing operations of the memory device 2400, a display 2100 and an input device 2200.

The SoC 150 may display data stored in the memory device 2400 through a display 2100 according to data input through an input device 2200. The input device 2200 may be implemented by a pointing device such as a touch pad or a computer mouse, a keypad, or a keyboard. The SoC 150 may control the overall operation of the computer system 2000 and the operations of the memory controller 2300.

The memory controller 2300, which may control the operations of the memory device 2400, may be implemented as a part of the SoC 150 or as a separate chip.

Figure 11:
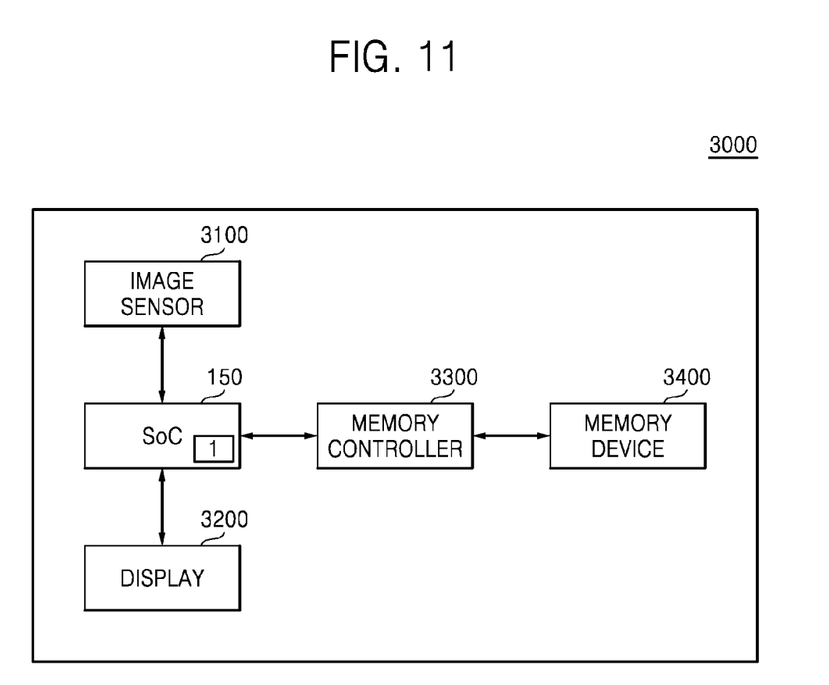
FIG. 11 is a block diagram of a computer system including an ESD protection circuit according to other exemplary embodiments.

FIG. 11 is a block diagram of a computer system including an ESD protection circuit according to other exemplary embodiments. Referring to FIG. 11, the computer system 3000 includes the SoC 150 including the ESD protection circuit 1 according to some embodiments, and the computer system 3000 may be implemented as an image process device like a digital camera, a cellular phone equipped with a digital camera, a smart phone equipped with a digital camera, or a tablet PC equipped with a digital camera.

The computer system 3000 includes the SoC 150, a memory device 3400 and a memory controller 3300 controlling the data processing operations, such as a program operation, an erase operation, and a read operation, of the memory device 3400. And, the computer system 3000 further includes an image sensor 3100 and a display 3200.

The image sensor 3100 included in the computer system 3000 converts optical images into digital signals and outputs the digital signals to the SoC 150 or the memory controller 3300. The digital signals may be controlled by the SoC 150 to be displayed through a display 3200 or stored in the memory device 3400 through the memory controller 3300.

Data stored in the memory device 3400 may be displayed through the display 3200 according to the control of the SoC 150 or the memory controller 3300. The memory controller 3300, which may control the operations of the SoC 150, may be implemented as a part of the processor 410 or as a separate chip.

The SoC 150 according to some embodiments may be packaged using at least one method among a through-silicon-via (TSV) process, a system in package (SIP), and a multichip package (MCP). The TSV process is a three-dimensional (3D) chip manufacturing process in which a plurality of SoCs 150 are vertically stacked and coupled to each other using a TSV in order to increase the density of semiconductor memory and memory modules.

The MCP is a package including a plurality of SoCs 150. The MCP allows necessary memories to be combined according to application products and greatly contributes to the spatial efficiency in mobile communication devices such as cellular phones.

As described above, according to some embodiments, a high voltage is controlled not to be directly applied to a gate of a medium gate oxide transistor in a high-voltage interface environment, and therefore manufacturing cost is reduced and the long-term reliability of an IC is guaranteed in a high-speed operating environment.

In addition, electrostatic current is not directly applied to the gate of the medium gate oxide transistor but is discharged through transistors connected in series in the high-voltage interface environment, so that the IC is protected even in an ESD event.

While the disclosure has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. An electrostatic discharge protection circuit comprising:
a first power line configured to provide a first power supply voltage;
a second power line configured to provide a second power supply voltage;
a ground line connected to a ground voltage terminal;
at least two stack transistors connected in series between the first power line and the ground line;
a first resistor connected between the first power line and a first node;
a first transistor and a first capacitor connected in series between the first node and the ground line;
a second transistor, connected between the second power line and a second node, and having a gate connected to the ground line;
a third transistor, connected between the first power line and a third node, and having a gate connected to the first node;
an inverter, connected between the third node and the ground line, and having an input connected to the second node;

a fourth transistor, connected to the first power line, and having a gate connected to the second node; and
a fifth transistor, connected between the second power line and the third node, and having a gate connected to a terminal of the fourth transistor,
wherein a gate of the first transistor is connected to the third node.

2. The electrostatic discharge protection circuit of claim 1, wherein the at least two stack transistors comprise:
a sixth transistor, connected to the first power line, and having a gate connected to the third node; and
a seventh transistor, connected between the sixth transistor and the ground line, and having a gate connected to an output node of the inverter.

3. The electrostatic discharge protection circuit of claim 2, wherein the inverter comprises:
an eighth transistor connected between the third node and a fourth node corresponding to the output node of the inverter; and
a ninth transistor connected between the fourth node and the ground line.

4. The electrostatic discharge protection circuit of claim 1, further comprising a second resistor connected between the gate of the second transistor and the ground line.

5. The electrostatic discharge protection circuit of claim 1, wherein the first power supply voltage is externally applied to the electrostatic discharge protection circuit and the second power supply voltage is generated from the first power supply voltage.

6. The electrostatic discharge protection circuit of claim 1, further comprising at least one resistor between the first power line and another terminal of the fourth transistor.

7. The electrostatic discharge protection circuit of claim 1, further comprising a second capacitor between the second power supply voltage and the ground line.

8. The electrostatic discharge protection circuit of claim 1, wherein the first power supply voltage is greater than the second power supply voltage.

9. An electrostatic discharge protection circuit comprising:
a first power line configured to provide a first power supply voltage;
a second power line configured to provide a second power supply voltage;
a ground line connected to a ground voltage terminal;
a stack circuit comprising at least two transistors connected in series between the first power line and the ground line to tolerate or discharge the first power supply voltage;
an electrostatic discharge pulse detector circuit configured to detect an electrostatic current between the first power line and the ground line;
an inverter controller circuit connected between the second power line and the ground line and configured to output a first signal having a voltage lower than the second power supply voltage;
an inverter unit connected between the first power line and the ground line and configured to output a second signal obtained by inverting the first signal and to apply the second signal to one of the transistors comprised in the stack circuit; and
a gate biasing circuit configured to apply a third signal obtained by changing the second power supply voltage according to the first power supply voltage to another one of the transistors comprised in the stack circuit and to the electrostatic discharge pulse detector.

10. The electrostatic discharge protection circuit of claim 9, wherein the electrostatic discharge pulse detector circuit comprises:
a first resistor connected between the first power line and a first node; and
a first transistor and a first capacitor connected in series between the first node and the ground line, wherein
the second power supply voltage is configured to be applied to a gate of the first transistor and then to the first capacitor in a normal mode, and
the electrostatic discharge protection circuit is configured to not apply a high voltage to the first node for a predetermined period of time in an electrostatic discharge event.

11. The electrostatic discharge protection circuit of claim 10, wherein the inverter controller circuit comprises a second transistor connected between the second power line and a second node and controls a voltage of the first signal output from the second transistor based on the second power supply voltage.

12. The electrostatic discharge protection circuit of claim 11, wherein the inverter controller circuit further comprises a second resistor connected between a gate of the second transistor and the ground line.

13. The electrostatic discharge protection circuit of claim 12, wherein the inverter unit comprises:
a third transistor connected between the first power line and a third node; and
an inverter, connected between the third node and the ground line, and having an input connected to the second node and an output connected to a fourth node, and
the inverter is configured to control the stack circuit to enable the electrostatic discharge protection circuit to tolerate the first power supply voltage in the normal mode and to enable the electrostatic discharge protection circuit to discharge the electrostatic current in the electrostatic discharge event.

14. The electrostatic discharge protection circuit of claim 13, wherein the gate biasing circuit comprises:
a fourth transistor, connected to the first power line, and having a gate connected to the third node; and
a fifth transistor, connected between the second power line and the third node, and having a gate connected to a terminal of the fourth transistor, wherein:
the second power supply voltage is biased to the gate of the first transistor as a voltage at the third node in the normal mode, and
the fourth and the fifth transistors are turned off in the electrostatic discharge event to lower a potential at the third node.

15. The electrostatic discharge protection circuit of claim 13, wherein the stack circuit comprises:
a sixth transistor, connected to the first power line, and having a gate connected to the second node; and
a seventh transistor, connected between the sixth transistor and the ground line, and having a gate connected to the fourth node, and
the seventh transistor is configured to be turned off in the normal mode to tolerate the first power supply voltage and be turned on in the electrostatic discharge event to discharge the electrostatic current.

16. The electrostatic discharge protection circuit of claim 13, wherein the inverter comprises:
a sixth transistor connected between the third node and the fourth node corresponding to the output of the inverter; and
a seventh transistor connected between the fourth node and the ground line, wherein:

the sixth transistor is configured to be turned on and the seventh transistor is configured to be turned off in the normal mode to tolerate the first power supply voltage, and both of the sixth and seventh transistors are configured to be turned on in the electrostatic discharge event to discharge the electrostatic current.

17. An electrostatic discharge protection circuit, comprising:
   a first power line configured to provide a first power supply voltage;
   a second power line configured to provide a second power supply voltage;
   a ground line connected to a ground voltage terminal;
   a stack circuit connected between the first power line and the ground line, the stack circuit configured to allow a current to flow between the first power line and the ground line during an electrostatic discharge event, and configured to prevent the first power line from being connected to the ground line during normal operation;
   a first resistor connected between the first power line and a first node;
   a first transistor and a first capacitor connected in series between the first node and the ground line;
   a second transistor, connected between the second power line and a second node, and having a gate connected to the ground line;
   a third transistor and an inverter, connected in series between the first power line and the ground line, the inverter having an input connected to the second node;
   a fourth transistor, connected to the first power line, and having a gate connected to the second node; and
   a fifth transistor connected to the second power line and having a gate connected to a terminal of the fourth transistor.

18. The electrostatic discharge protection circuit of claim 17, further comprising:
   a third node connected to a gate of the first transistor, connected between a terminal of the third transistor and the inverter, and connected to the stack circuit.

19. The electrostatic discharge protection circuit of claim 18, wherein the third node is further connected between a terminal of the fifth transistor and a gate of a first transistor.

20. The electrostatic discharge protection circuit of claim 17, wherein the stack circuit includes at least two transistors connected in series between the first power supply voltage and the ground voltage.

* * * * *